United States Patent

[11] 3,548,721

[72] Inventor Edwin B. Eisennegger
Bildweg 657, Bronschhofen, Saint Gall, Switzerland
[21] Appl. No. 714,847
[22] Filed Mar. 21, 1968
[45] Patented Dec. 22, 1970
[32] Priority Mar. 22, 1967
[33] Switzerland
[31] No. 4324/67

[54] APPARATUS WITH PISTON
14 Claims, 8 Drawing Figs.
[52] U.S. Cl. ............................................. 92/153, 92/165, 92/168, 123/90, 184/6, 184/18, 277/59
[51] Int. Cl. ......................................................... F01b 31/10, F16j 15/18
[50] Field of Search ............................................ 92/165, 168, 153; 123/90L; 184/6N, 6S, 18; 277/59, 32

[56] References Cited
UNITED STATES PATENTS

| | | | |
|---|---|---|---|
| 2,595,592 | 5/1952 | Magnuson | 92/153 |
| 2,678,609 | 5/1954 | Ashton | 92/153 |
| 927,162 | 7/1909 | Perry | 92/168 |
| 1,218,132 | 3/1917 | Tuhey | 92/153X |
| 1,334,104 | 3/1920 | Lemp | 92/153 |
| 1,353,290 | 9/1920 | Stokke | 92/168X |
| 1,464,821 | 8/1923 | Jorgensen | 92/165X |
| 1,510,422 | 9/1924 | Steinbrecher | 184/18 |
| 1,871,820 | 8/1932 | Morton | 184/18X |
| 1,922,707 | 8/1933 | Newcomb | 184/18X |
| 2,083,686 | 6/1937 | Campbell | 92/153X |
| 2,166,857 | 7/1939 | Bugatti | 92/153X |
| 2,194,732 | 3/1940 | Aikman | 184/6X |
| 2,236,266 | 3/1941 | Hewitt | 92/168X |
| 2,298,749 | 10/1942 | Buschmann | 184/6X |
| 2,426,613 | 9/1947 | Jackson | 92/153 |
| 2,647,809 | 8/1953 | Schindler | 92/168X |
| 3,011,845 | 12/1961 | Watt et al. | 92/168X |

Primary Examiner—Martin P. Schwadron
Assistant Examiner—Leslie J. Payne
Attorney—David A. Roden ABSTRACT: At least one annular flexible or elastic lubricant seal scraper is provided in the cylinder wall of a piston-containing apparatus such as an air compressor, the seal scraper bears against the piston sidewall surface during the compression stroke of said piston to prevent passage of lubricant into the compression chamber and the seal/scraper lifts away from the piston sidewall surface during the intake stroke to allow any lubricant on the piston sidewall surface to escape into a lubricant collecting chamber and thus minimize the amount of lubricant within the compression chamber. The piston has no piston rings and consequently has a smooth, uninterrupted surface. Two diverging leg guides may form a lubricant collecting chamber and high viscosity lubricants, such as grease, may be inserted into the chamber, if desired. Pressure from the compression stroke may be utilized for urging the lubricant in the chamber against the piston and for urging the scraper against the piston.

APPARATUS WITH PISTON

The present invention relates to apparatus with pistons. More particularly it relates to apparatus or machines having at least one cylinder with a reciprocating piston therein, such as high pressure air compressors or pumps.

The vast majority of high pressure air compressors include a piston and a corresponding cylinder machined to close tolerances with respect to one another. The sidewalls of the piston surface usually have a plurality of annular grooves formed therein into which rings are fitted, e.g. compression rings for preventing gases from leaking past the piston during the compression and/or power strokes of an engine and an oil ring for scraping excess lubricating oil from the cylinder wall.

In some high pressure air compressors, the rings are placed in grooves in the cylinder sidewall and bear against the piston sidewall. These machines, likewise, require close tolerances between the piston and corresponding cylinder.

In the present invention, the sidewall of the cylindrical piston between the piston head and the bottom of the piston is smooth and uninterrupted by annular grooves for the piston rings. An annular resilient and flexible lubricant seal/scraper is mounted in the sidewall of the cylinder, said seal/scraper being located so that it is always opposite the sidewall of the piston during reciprocating movement of the piston. In the first embodiment, the insert means when viewed in cross section is Y-shaped the single leg of the Y being mounted in the cylinder sidewall and the remaining pair of legs forming a V-shaped lubricant chamber, the distal ends of the V-legs bearing against the piston sidewall and being opposite the same without interruption while it reciprocates within the cylinder.

With particular reference to high pressure air compressors of the prior art, it is known to lubricate the pistons moving in the cylinder with centrifugal or splash lubrication from the crankcase. In such case the pistons are provided with piston rings.

This lubricating method has the disadvantages that, on the one hand, these devices must be run in a vertical or upright position, with the crankcase at the bottom and, in particular with compressors, the compressed air has a high oil content. It is also known to lubricate the pistons of piston air compressors from the outside using a grease gun. This lubricating method is disadvantageous because the lubrication can only be carried out when the compressor is stopped. Furthermore, the lubricant film has only a brief life and has to be replenished periodically and at relatively short intervals.

The high pressure grease-free compressors, as known, have porous metal surfaces, and therefore, require precision machining of parts, which makes them expensive to manufacture.

Accordingly, it is an object of the present invention to provide a high pressure air compressor that may be manufactured at lower cost by utilizing larger tolerances while sealing with a novel apparatus.

It is another object to provide longer lasting lubrication.

It is a further object to provide a piston machine which may be operated in other than vertical or upright position, with little or no contamination of the compressed air.

It is another object to provide the possibility of air intake through the crankcase and also to eliminate the need for crankcase ventilation while running the compressor. It is also possible that filters can be provided in the crankcase of the apparatus.

Another object is to provide a closed circulating lubrication system.

One advantage of the present invention is the fact that the lubricating chamber is outside of the principal heat area or zone that occurs in the compression chamber of pneumatic devices, apparatus and machines. Therefore the scraper legs can consist of synthetic materials such as polyurethane, polyamides, fluorocarbon polymers, neoprene and the like, and the viscosity of the lubricating agent is maintained substantially constant even with the heat present during operations of the device.

In a presently preferred form of the invention, a pressure chamber in connection with compression chamber utilizes compressed air on the side of the scraper leg which is opposite the side touching the piston wall, to thereby urge the scraper leg against the piston and improving the scraping action.

Another advantage of the invention is the fact that a lubricant chamber can be provided which is connected to a lubricant supply source that can be serviced from the exterior, even while the apparatus is running.

A further advantage is the fact that a closed, circulating lubrication system can be provided in certain of the devices according to the invention.

The manner in which the above mentioned and other objectives and advantages are accomplished will be apparent from the following description, taken in conjunction with the accompanying drawings, and in which.

Figure 1:
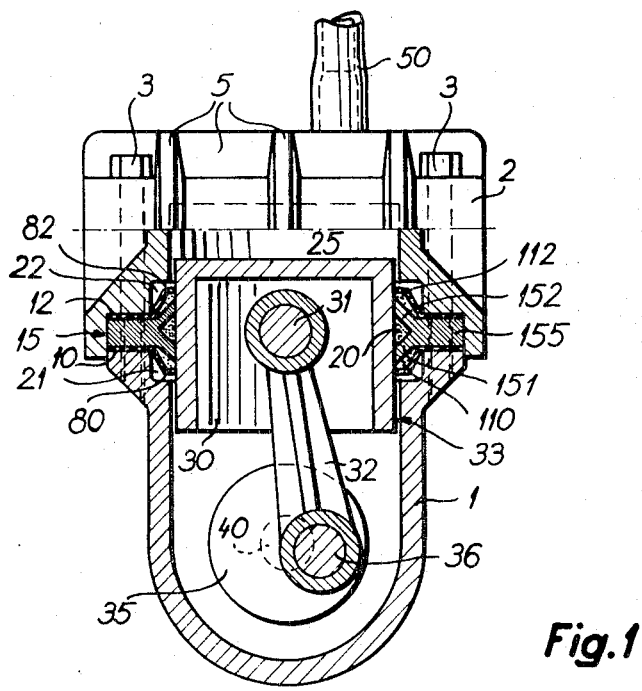
FIG. 1 is a vertical cross section of an air compressor including the first embodiment of the invention.

Referring now to FIG. 1, a cylinder head 2 is affixed to a crankcase 1 by clamping screws 3. An insert means 15 and a second and first flexible seal/scraper means 10 and 12, respectively, are clamped between the crankcase housing 1 and the cylinder head 2. A second and first leg guide 151 of the cross-sectionally Y-shaped insert 15 enclose a lubricant collecting chamber 20 in connection with the piston surface 33 of an oscillating piston 30. The legs 151 and 152 and the second and first annular flexible flanges, 80 and 82 respectively, particular structures of the sealing means 10 and 12 and enclose second and first collecting rooms 110 and 112 respectively. The single leg 155 of the Y-shaped insert means 15 is concentrically held by a recess in the cylinder head 2. Second and first pressure chambers 21 and 22, respectively, are formed respectively in the crankcase 1 and the cylinder head 2. These chambers are adjacent the second and first flanges 80 and 82 and have openings facing piston surface 33. The pressure chamber 21 is in communication with crankcase 1, and the pressure chamber 22 is in communication with cylinder head high pressure compression chamber 25 in the cylinder head 2. The V-shaped legs 151 and 152 are guides for the oscillating or reciprocating piston 30 which is in articulated connection with a connecting rod 32 by a piston bolt or wrist pin 31. The connecting rod 32 itself is in articulated connection with an eccentric shaft 36 on a crankshaft 35, having a drive shaft 40 held by bearings in the crankcase and passing therethrough to the exterior where it is connected to a power source (not shown) such as a one-half hp. electric motor. A pressure fluid connection 50 on the cylinder head 2 is shown, but the well known inlet and outlet valves are not shown. Cooling ribs 5 on the cylinder head 2 are provided for dissipation of heat caused by compression of air.

The piston 30 is guided by said V-shaped legs 151 and 152 on both sides of the lubricant collecting chamber 20 formed in the legs of the insert 15. During the full piston stroke the top and bottom ends of piston sidewall 33 do not pass the outer ends of said legs 151 and 152 so the legs may be described as always being opposite the piston sidewall. Lubricant once filled in the lubricant collecting chamber 20 (limited by the V-shaped legs 151 and 152 and wall 33 of piston 30) provide long-lasting lubrication of the adjacent piston surface 33. Lubricant drawn out of the collecting chamber 20 by the piston sidewall surface 33 through the gap between itself and the two legs 151 and 152 will be scraped away from the piston surface by the two flanges 80 and 82 which are in close contact with the piston surface, and will be collected in the respective collecting rooms 110 and 112. This avoids penetration of lubricant in the adjacent crankcase 1 and particularly escape into compression chamber 25. In view of the pressure connection of the chambers 21 and 22 surrounding the flanges 80 and 82 with the respective chambers in the crankcase 1 and the cylinder head 2, during reciprocal movement of the piston, pressure will alternately be increased and reduced, the increased pressure will press the flanges 80 and 82 on the piston surface with a greater force than by their own tension and the negative pressure will tend to lift them away from the piston surface. These reinforced pressures occur during the upward movement of the piston 30 for flanges 82 and during the downward movement for flange 80 respectively. This positive pressure prevents any substantial or significant amount of lubricant being carried into either the crankcase or the compression chamber 25. The negative pressure, which lifts the flanges from the piston, allows any lubricant on the piston to be carried past the corresponding flange into the lubricant collecting chamber. Accordingly the delivered pressurized air flowing out of the chamber 25, through pressure fluid connection 50, will be substantially free of lubricant.

This compressed air device (motor or compressor) can be used in any desired position, e.g., standing vertically or positioned horizontally without entrance of unwanted lubricant into the compressed air chamber collecting tank. The lubricant enclosed in the small chamber 20 provides a constant efficient lubrication. It is believed that the lubricant circulates into and out of the lubricant collecting chamber 20. The lubricant is continuously taken out of said chamber, collected in the collecting rooms 110 and 112 and recirculated into the lubricant collecting chamber. Means to further insure such circulation are discussed hereinafter.

The construction of this compressor is relatively simple and its fabrication inexpensive in view of the fact that the cylinder wall is formed from two detachable parts which are assembled in alignment by four bolts 3. Rings do not have to be placed on the piston sidewall nor do they have to be fit in circumferential grooves in the cylinder sidewall. Rather a cylinder "groove" is formed by the recesses which are machined (or which may be cast) into the cylinder head 2 and crankcase 1. Thus the entire annular lubricating means is simple to put in place during the original assembly, and is very easy to replace when necessary. Furthermore, the tolerances between the cylinder sidewall and piston sidewall may be much greater than normally is practical, and the clearance between the internal diameter of the legs 151 and 152 and the O.D. of piston 30 may be up to 0.012 inch. Furthermore, the crankcase is absolutely free of lubricant so that it can be used as the fresh air inlet if an inlet valve (not shown) is provided in the piston face. In this embodiment the crankcase can be used to house an air filter.

Another advantage of the invention is the arrangement of the seal/scraper means out of the hot zone of the compressor, i.e., the topmost portion of the cylinder head. Accordingly the seal/scraper means can be manufactured of synthetic polymers, especially polyurethane and similar flexible, oil-resistant elastomers. Also the viscosity of the lubricant will remain more constant, i.e., a lubricant once chosen can be filled and will not substantially change in viscosity during operation.

Figure 2:
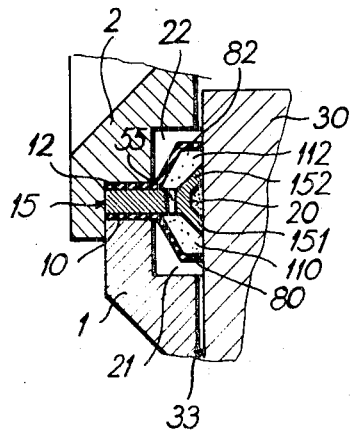
FIG. 2 is a vertical cross section showing a partial view of a modified form of the lubricating means in an air compressor as in FIG. 1.

Referring now to FIG. 2, instead of the separate arrangement of the two collecting rooms between the flanges 80 and 82 and the legs 151 and 152 of the insert means 15 clamped between the crankcase 1 and the cylinder head 2 as shown in FIG. 1, there is provided a bore 55 connecting the collecting rooms 110 and 112 with each other. Accordingly the lubricant scraped off from the piston surface by the flanges 80, 82 will be able to circulate in rooms 110, 112 practically independent of pressure differences which may occur between the crankcase and the pressure room in the cylinder head. It is possible that grease would accumulate in room 112 and impair the function of flange 82. The bore 55 prevents such one-sided build up (and resulting static condition) in rooms 110 or 112.

Figure 3:
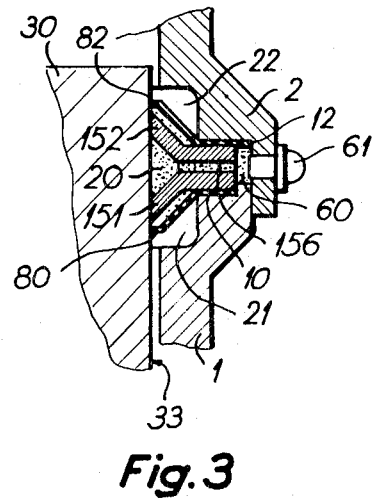
FIG. 3 is a vertical cross section showing a partial view of another modification of the lubricating means in an air compressor as in FIG. 1.

Referring now to FIG. 3, in addition to the aforementioned arrangements a lubricant feed chamber 60 is provided between the crankcase 1 and the cylinder head 2 facing towards the insert means 15. A lubrication nipple (grease fitting) 61 is provided in the wall surrounding the lubricant feed chamber 60. At least one channel 156 is provided, the channel leading into the lubricant collecting chamber 20 formed between the two V-shaped legs 151, 152 and the piston surface 33. The axial sealing between the crankcase 1 and the cylinder head 2 is guaranteed by seal/scraper means 10, 12 and the at least partially elastic flanges 80, 82. Insert means 15 and seal/scraper means 10 and 12 can be entered as shown. The advantage of this arrangement can be seen in the possibility of lubricant replenishment without dismantling of the device and replenishment may be accomplished while the compressor is running. Of course it is possible to limit the maximum lubricant pressure in the lubricant collecting chamber using a special lubrication nipple which has a relief valve or other safety feature.

Figure 4:
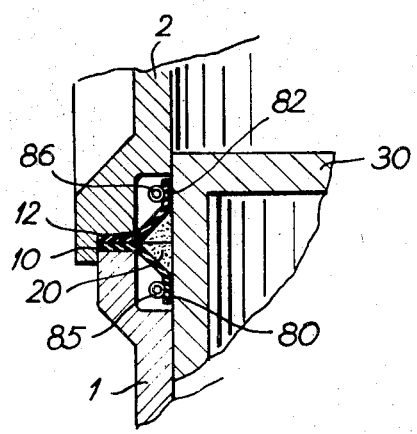
FIG. 4 is a vertical cross section showing a partial view of still another modification of the lubricating means in an air compressor as in FIG. 1.

Referring now to FIG. 4, this illustrates a modification which is particularly useful as a low cost, easy to manufacture air compressor. Especially in smaller sized units, it is possible to guide the piston 30 in the cylinder parts 1 and 2 during the oscillation movement. Seal/scraper means 10 and 12 are provided between the crankcase 1 containing the lower cylinder bore and the cylinder head 2 containing the upper cylinder bore. Flanges 80, 82 are unitary extensions of seal/scraper means 10, 12. The flanges are in close contact with the piston surface 33. This close contact with the piston surface 33 is enhanced by second and first garter springs 85, 86 respectively. The lubricant collecting chamber 20 is enclosed by said flanges 80, 82 and the piston surface 33. Constant lubrication of this air compressor is possible in any operating position.

In operation the compression stroke builds up pressure in chamber 25 and urges the flange 82 against the piston. On the downstroke the negative pressure in chamber 25 tends to lift the scraper 82, reducing friction and allowing lubricant clinging to the piston to return to the lubricant collecting chamber 20. The same occurs with regard to the lower flange 80, but of course in reverse order. This is of particular use where the compressor is going to be operated at all times in a fixed vertical position. In such case, in order to prolong the time before it is necessary to replenish the lubricant, one may fill the crankcase with a light lubricating oil and splash-lubricate the lower piston surface (and also the wrist pin, connecting rod, etc. in the crankcase, thus allowing for the use of more inexpensive, nonsealed bearings at these points).

Figure 5:
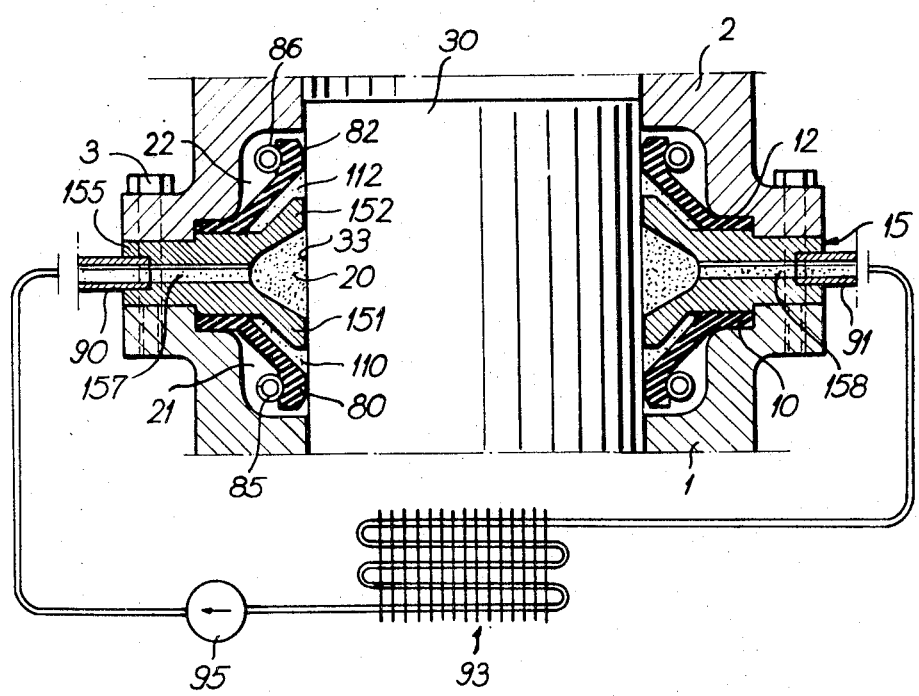
FIG. 5 is a vertical cross section of a portion of an air compressor as in FIG. 1 showing another form of the novel lubricating means and showing schematically a lubricant cooling and circulating system in conjunction therewith.

Referring now to FIG. 5, high pressure devices often need forced cooling. This forced cooling can be achieved according to FIG. 5 by circulation of the lubricant. A Y-shaped insert 15 with legs 151 and 152 defining the lubricant collecting chamber 20 and the clamping leg 155 which contains the lubricant channels 157 and 158 is clamped between the cylinder head 2 and the crankcase. Seal/scraper means 10 and 12 connected to flanges 80 and 82, which are pressed against the wall of the piston 30 by springs 85 and 86, are provided in such a way that collecting rooms 110 and 112 between the legs 151 and 152 and the seal/scraper means 12 and 10 remain free. Outside of the seal/scraper means 10 and 12 with the flanges 80 and 82, pressure chambers 21 and 22 have been formed in the crankcase 1 and cylinder head 2. The lubricant collecting chamber 20 in the insert 15 is connected to a lubricant outlet duct 91. The subsequent elements in connection with this duct 91 are a cooling device 93 for heat exchange, a lubricant pump 95 and a lubricant pressure duct connected to a lubricant channel in the leg 155 of the insert 15 leading into the lubricant collecting chamber 20 on the opposite side of channel 158. During operation of the compressor the lubricant pump 95 is operating, drawing lubricant out of the collecting chamber through the outlet duct 91. The negative circulating lubricant is also a coolant for the device per se, helping also to cool the piston which is heated by the compression work. Operation of the device is possible in any position. Lubricant taken by the piston surface out from the collecting chamber recirculates back to it after collection in the collecting rooms 110, 112. The pressure of each compression stroke of the piston acts on the flanges 80, 82 such that it is pressed on the piston surface scraping lubricant therefrom and avoiding entrance of lubricant in the pressure chambers 21, 22. Efficient cooling of the piston in combination with excellent lubrication thereof is provided by this favorable and very easy construction of the device.

It is characteristic of the above described compressors that both the crankcase and the cylinder head room 25 are free of lubricant during operation. However, as mentioned in connection with FIG. 4, it might be desirable in some applications to have a large lubricant reservoir in the crankcase such that both the crank wheel and the piston surface are lubricated, but without entrance of lubricant in the compression room 25. One possibility for such a device is shown in FIG. 6.

Figure 6:
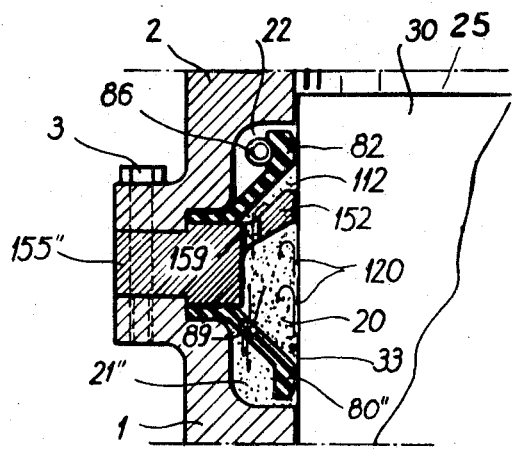
FIG. 6 is a vertical cross section of a slightly different form of a portion of the cylinder and piston of an air compressor showing another embodiment of lubricating means according to the invention.

In FIG. 6, the insert means 15 with the leg 155" clamped between the crankcase 1 and the cylinder head 2 has only one leg 152 guiding the reciprocating piston 30. A backflow opening 159 from the collecting room 112 into the lubricant collecting chamber 20 is provided in leg 152. The flange 82 arranged between the leg 152 and the cylinder head 2 is provided with a first garter spring 86 forcing the scraper means 82 toward the piston surface 33. A passage 89 is provided in the second scraper means between the collecting chamber 20 and the crankcase. Lubricant flow lines 120 are shown in the lubricant collecting chamber 20 and through the backflow opening 159 and the passage 89. The air pressure in 25 the compression chamber communicates with the first pressure chamber 22 to force the flange 82 toward the piston surface 33. Lubricant taken with the piston surface out of the lubricant collecting chamber 20 will be scraped away and collected in the room 112. Such collected lubricant will flow out of this room 112 through the backflow opening 159 in the lubricant collecting chamber 20. A further release of pressure in chamber 20 occurs through passage 89 in the second annular flexible flange 80" into chamber 21" which is in essence in communication with the large lubricant reservoir in the crankcase. The flange 80" between the chamber 20 and the crankcase prevents carrying of excess lubricant into the chamber 20 with each compression stroke.

It is not essential to provide the piston guide 152, rather one can select suitable tolerances and use the cylinder sidewall to guide the piston.

Figure 7:
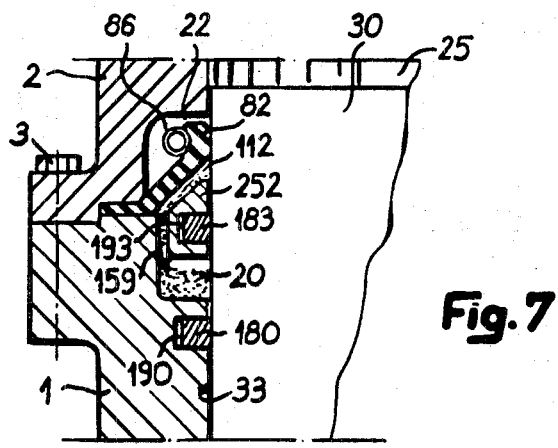
FIG. 7 is a view as in FIG. 6 of yet another modification of the lubricating means according to the invention.

Referring now to FIG. 7, a leg 252 is provided in the crankcase 1 for guiding the piston. One or more backflow openings 159 are provided in leg 252. The lubricant collecting chamber 20 is enclosed by leg 252 and the crankcase itself. The openings 159 lead from the lubricating collecting room 112 between the leg 252 and the flange 82, which in turn is provided with a garter spring 86 forcing said scraper against the piston surface 33. The second and first seal/scraper means in the form of sealing rings 180 and 183, respectively, are inserted in the second and third annular grooves 190 and 193, respectively. These sealing rings 180 and 183 are preferably made of an elastic material such as a fluorocarbon polymer—e.g. polytetrafluorethylene, and are in close contact with the piston surface 33. A pressure transmitting connection exists between the chamber 22 and the compression chamber 25 in the cylinder head.

Guiding of the piston is effected by the two sealing rings 180 and 183 which therefore are not too flexible. These sealing rings are also lubricant retaining means. For an absolutely lubricant-free compression chamber, a flange 82 is provided between the upper sealing and guiding ring 183 and the pressure chamber 22. Lubricant scraped flange 82 is collected in the adjacent room 112 which is in connection with the collecting chamber 20.

Figure 8:
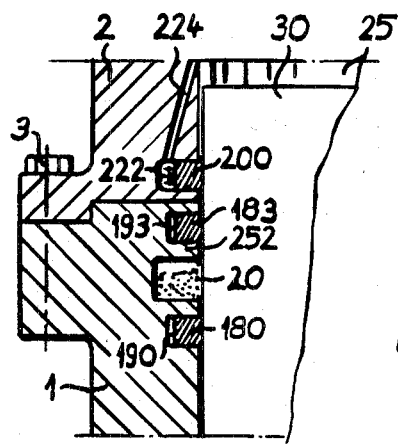
FIG. 8 is a view as in FIGS. 6 and 7, showing a further modified lubricating means for cylinder pistons.

FIG. 8 illustrates in another embodiment utilization of the pressure build up in the compression chamber to assure an oil-free compression chamber 25. The annular seal/scraper means in the form of an annular sealing ring 200 is inserted in an annular groove 222. Groove 222 has a greater outside diameter, i.e. a greater depth, than is necessary for the sealing ring 200. The radial space between the outer limit of the ring 200 and the outer wall of the groove 222 is in connection with the chamber 25 in the cylinder head by at least one but preferably a plurality of pressure channels 224 along the circumference of the groove 222. Pressure build up on the compression stroke urges ring 200 into scraping contact with piston sidewall 33.

If desired, a tough, porous, oil-absorbing material may be placed in the lubricant collecting chamber 20 such as a porous rubbery or a porous plastic material. This provides a limited measured delivery of lubricant on the piston surface 33.

In the various forms of the invention the resilient, elastic scrapers can be formed of a suitable metal if desired. Also, the communication between the compression chamber 25 and the pressure chamber 22 which surrounds the exterior face of the flange 82 does not have to be via the clearance between the piston and cylinder sidewalls, but rather may be means of appropriate ports, similar to the pressure channel 224 illustrated in FIG. 8.

It is of course possible that pistons and cylinders of other than round cross section can be manufactured, and the present invention would also be useful in such apparatus.

I claim:

1. Apparatus having particular utility in an air compressor to prevent the passage of lubricant into a compression chamber and to allow any lubricant within the compression chamber on the sidewall of the piston to escape into a lubricant collecting room and thus minimize the amount of lubricant within the compression chamber which would subsequently enter into the compressed air, said apparatus comprising:

a. a crankcase housing having cylindrical crankcase sidewall defining a hollow crankcase cylinder to receive a piston;

b. a cylinder head having a head surface and a cylindrical head sidewall defining a hollow head cylinder to receive a piston, said hollow head cylinder being substantially the same diameter as said hollow crankcase cylinder, said head sidewall including a first annular groove;

c. means for positioning and securing said cylinder head to said crankcase housing wherein said crankcase cylinder is in substantial alignment with said head cylinder and wherein the crankcase cylinder and the head cylinder combine to form a piston chamber;

d. a loose fitting reciprocating cylindrical piston positioned within said piston chamber at a relatively substantial distance from said head sidewall and said crankcase sidewall, said piston including a smooth outer cylindrical sidewall surface opposite said first annular groove during reciprocal movement of said piston and defining with said first annular groove a first pressure chamber, said piston defining a high pressure compression chamber between said piston, said head surface, and said cylindrical head sidewall;

e. first flexible seal/scraper means clamped between the cylinder head and crankcase cylinder and located within said first pressure chamber for movement toward and into engagement with said piston to provide an annular seal about said piston to prevent the compressed air from escaping past said piston and to scrape lubricant from said piston during a compression stroke of said piston and for movement away from and into disengagement with said piston during an intake stroke to allow any lubricant on said sidewall surface to be carried by said piston beyond said flexible seal/scraper means toward said crankcase and thus minimize the amount of lubricant within the compression chamber, said seal/scraper means including passage means communicating between said compression chamber and the radially outer portion of said first pressure chamber to increase and decrease the air pressure on the radially outer surface of said flexible seal/scraper means relative to the radially inward surface of said seal/scraper means said to afford movement of said seal/scraper means into engagement with said piston and disengagement with said piston.

2. An apparatus according to claim 1, wherein:
a. said cylindrical crankcase sidewall of said crankcase housing includes a second annular groove opposite said sidewall surface of said piston to define a second pressure chamber; and wherein
b. said apparatus includes a second seal/scraper means located within said second pressure chamber for guiding of said piston, for providing an annular air seal about said piston, and for scraping lubricant from said piston.

3. An apparatus according to claim 2 wherein said first seal/scraper means includes a first annular flexible flange secured at the radially outer edge of said first flange between said cylinder head and said crankcase housing and extending radially obtusely toward said cylinder head to engage said piston and defining a first pressure chamber in engagement with the radially outward surface of said first flange and a collecting room defined by the radially inward surface of said first flange with said piston.

4. An apparatus according to claim 3 including a piston guide means located between said first and second seal/scraper means and supported by said housing for providing additional sealing and guidance of said piston, and including an annular groove within said housing for defining a lubricant collecting chamber with said piston; and wherein said apparatus includes a backflow opening leading from said collecting room to said lubricant collecting chamber.

5. An apparatus according to claim 3 wherein said second seal/scraper means includes a second annular flexible flange secured at the radially outwardly edge of said second flange between said cylinder head and said crankcase housing and extending radially obtusely toward said crankcase to engage said piston and defining a second pressure chamber in engagement with the radially outward surface of said second flange and a collecting room defined by the radially inward surface of said second flange with said piston, and wherein, said second seal/scraper means includes passage means communicating between said second pressure chamber and said crankcase to afford movement of said second flange into engagement with said piston to provide an annular seal about said piston and to scrape lubricant from said piston during an intake stroke of said piston and for movement away from and into disengagement with said piston during a compression stroke of said piston to effectively prevent the lubricant from entering said crankcase and to allow any lubricant on the sidewall surface to be carried by the piston beyond said second seal/scraper means toward said cylinder head.

6. An apparatus according to claim 5 wherein said first seal/scraper means includes a first garter spring positioned on the radially outward surface of said flange adjacent said piston to additionally urge said flange into engagement with said piston.

7. An apparatus according to claim 6 wherein said second seal/scraper means includes the second garter spring positioned on the radially outward surface of said second flange adjacent said piston to additionally urge said second flange into engagement with said piston.

8. An apparatus according to claim 7 wherein said first and second flanges are directly abutted between said cylinder head and said crankcase housing.

9. An apparatus according to claim 6 including insert means positioned between the radially outer edges of said first and second flanges and including a first leg guide extending radially obtusely toward said cylinder head to engage said piston to define a lubricant collecting chamber between said first leg and said second seal/scraper means.

10. An apparatus according to claim 9 wherein said first leg guide includes a backflow opening between said first collecting room and said lubricant collecting chamber to permit the return flow of lubricant from said first collecting room from said lubricant collecting chamber; and wherein said second flange includes a passage between said lubricant collecting chamber from said second pressure chamber to permit the movement of lubricant from said lubricant collecting chamber to said second pressure chamber.

11. An apparatus according to claim 9 including a second leg guide extending from said insert means radially obtusely toward said crankcase to engage said piston for defining a second collecting room between said second leg guide and said second flange.

12. An apparatus according to claim 5 including:
a. insert means positioned between the radially outer edges of said first and second flanges and including a first leg guide extending radially obtusely toward said cylinder head to engage said piston to define a lubricant collecting chamber between said first leg and said second seal/scraper means; and
b. a second leg guide extending from said insert means radially obtusely toward said crankcase to engage said piston for defining a second collecting room between said second leg guide and said second flange; and wherein said insert means includes a bore extending between said first and second collecting rooms to provide lubricant flow therebetween.

13. An apparatus according to claim 5 including:
a. insert means positioned between the radially outer edges of said first and second flanges and including a first leg guide extending radially obtusely toward said cylinder head to engage said piston to define a lubricant collecting chamber between said first leg and said second seal/scraper means;
b. a second leg guide extending from said insert means radially obtusely toward said crankcase to engage said piston for defining a second collecting room between said second leg guide and said second flange; and wherein said insert means includes a lubricant channel extending between said lubricant collecting chamber and the radially outward edge of said insert means; and including a lubricant feed means operatively connected to the radially outward edge of said insert means to provide a lubricant fluid connection from the outside of the air compressor to the lubricant collecting chamber.

14. An apparatus according to claim 13 wherein said lubricant feed means includes forced cooling of the lubricant.